United States Patent
Iijima et al.

(10) Patent No.: US 12,383,987 B2
(45) Date of Patent: *Aug. 12, 2025

(54) LEAD-FREE AND ANTIMONY-FREE SOLDER ALLOY, SOLDER BALL, BALL GRID ARRAY, AND SOLDER JOINT

(71) Applicant: Senju Metal Industry Co., Ltd., Tokyo (JP)

(72) Inventors: Yuuki Iijima, Tokyo (JP); Shunsaku Yoshikawa, Tokyo (JP); Takashi Saito, Tokyo (JP); Kanta Dei, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 607 days.

This patent is subject to a terminal disclaimer.

(21) Appl. No.: 17/633,608

(22) PCT Filed: Jul. 29, 2020

(86) PCT No.: PCT/JP2020/029029
§ 371 (c)(1),
(2) Date: Feb. 8, 2022

(87) PCT Pub. No.: WO2021/029222
PCT Pub. Date: Feb. 18, 2021

(65) Prior Publication Data
US 2022/0324061 A1 Oct. 13, 2022

(30) Foreign Application Priority Data
Aug. 9, 2019 (JP) .................. 2019-147986

(51) Int. Cl.
*C22C 13/00* (2006.01)
*B23K 35/02* (2006.01)
*B23K 35/26* (2006.01)

(52) U.S. Cl.
CPC ........ *B23K 35/262* (2013.01); *B23K 35/0244* (2013.01); *C22C 13/00* (2013.01)

(58) Field of Classification Search
CPC ............ C22C 13/00; C22C 13/02; C22F 1/16
See application file for complete search history.

(56) References Cited

U.S. PATENT DOCUMENTS

| | | | |
|---|---|---|---|
| 7,282,175 B2 | 10/2007 | Amagai et al. | |
| 8,691,143 B2 | 4/2014 | Ohnishi et al. | |
| 10,322,471 B2 | 6/2019 | Choudhury et al. | |
| 2002/0051728 A1 | 5/2002 | Sato et al. | |
| 2008/0292492 A1 | 11/2008 | Ingham et al. | |
| 2009/0304545 A1 | 12/2009 | Tanaka et al. | |
| 2014/0328719 A1 | 11/2014 | Chen | |
| 2015/0224604 A1 | 8/2015 | Choudhury et al. | |
| 2016/0023309 A1 | 1/2016 | Choudhury et al. | |
| 2019/0157535 A1* | 5/2019 | de Avila Ribas | ....... H01L 24/32 |
| 2020/0061757 A1 | 2/2020 | Nishino et al. | |

FOREIGN PATENT DOCUMENTS

| | | |
|---|---|---|
| EP | 1468777 A1 | 10/2004 |
| JP | 200220807 A | 1/2002 |
| JP | 2004261863 A | 9/2004 |
| JP | 2007237252 A | 9/2007 |
| JP | 2016500578 A | 1/2016 |
| JP | 201823987 A | 2/2018 |
| JP | 2018167310 A | 11/2018 |
| JP | 2019126827 A | 8/2019 |
| JP | 2020015054 B1 | 1/2020 |
| WO | 2009022758 A1 | 2/2009 |
| WO | 2016012754 A2 | 1/2016 |
| WO | 2018159664 A1 | 9/2018 |
| WO | 2019167705 A1 | 9/2019 |

OTHER PUBLICATIONS

Office Action from the Mexican Institute of Industrial Property for related application MX/a/2022/001714 dated Dec. 14, 2022 and an English Translation thereof.
Office Action from the European Patent Office for related application EP 20851960.3 dated Jan. 7, 2025.

* cited by examiner

*Primary Examiner* — Jessee R Roe
(74) *Attorney, Agent, or Firm* — The Webb Law Firm

(57) ABSTRACT

Provided are a solder alloy and a solder joint which have high tensile strength, can suppress Ni leaching and can suppress generation of voids at a bonded interface. The solder alloy has an alloy composition consisting of, by mass %, —Ag: 1.0 to 4.0%, Cu: 0.1 to 1.0%, Ni: 0.005 to 0.3%, Co: 0.003 to 0.1%, and Ge: 0.001 to 0.015% with the balance being Sn The alloy composition satisfies the following relation (1):

$0.00030 < (Ni/Co) \times (1/Ag) \times Ge < 0.05$     (1)

Co, Ag, and Ge in the relation (1) each represent the contents (mass %) in the alloy composition.

9 Claims, No Drawings

LEAD-FREE AND ANTIMONY-FREE SOLDER ALLOY, SOLDER BALL, BALL GRID ARRAY, AND SOLDER JOINT

CROSS-REFERENCE TO RELATED APPLICATIONS

This application is the United States national phase of International Application No. PCT/JP2020/029029 filed Jul. 29, 2020, and claims priority to Japanese Patent Application No. 2019-147986 filed Aug. 9, 2019, the disclosures of which are hereby incorporated by reference in their entirety.

BACKGROUND

Field

The present invention relates to a lead-free and antimony-free solder alloy, solder ball, and solder joint that have high tensile strength and suppress Ni leaching and the generation of voids at the bonded interface.

Description of Related Art

In recent years, electronic devices are required to have higher integration, larger capacity and higher speed. For example, a semiconductor package such as QFP (Quad Flat Package) is used, and high integration and high functionality at the semiconductor chip level is being pursued. In manufacture of QFP, a packaging process of die bonding a silicon chip cut from a silicon wafer to a lead frame is employed.

In QFP, which is obtained by bonding microelectrodes such as BGA (Ball Grid Array), a solder joint is formed by die bonding the silicon chip and the lead frame with a solder alloy. A back metal, for example, having a Ni layer as the outermost layer is formed on the silicon chip, in order to improve the wettability with the solder and improve the adhesive strength. However, when the Ni layer being the outermost layer is in contact with molten solder, the Ni layer melts into the molten solder and Ni leaching occurs. Here, a barrier layer such as Ti is usually formed on the back metal to suppress Ni from diffusing into the silicon chip. When Ni leaching progresses and the Ti layer is exposed, the back metal repels the molten solder without wetting, because the wettability of the solder alloy to Ti is very poor. Moreover, even if a little of the Ni layer remains, Ni atoms diffuse into the molten solder and Ti hardly diffuses into the Ni. Therefore, the number of voids increase at the atomic level at an interface between the Ti layer as the barrier layer and the Ni layer, and the adhesive strength at the interface between the little remaining Ni layer and the Ti layer is extremely reduced. As a result, the bonded section after die bonding may be inferior in impact resistance and heat cycle resistance. Thus, retaining the Ni layer of the back metal is extremely important in die bonding.

Further, in a microelectrode such as BGA, solder bumps are formed by using solder balls. When solder balls are used, adhesive flux is applied to the microelectrode and solder balls are placed on the electrode coated with flux. After that, the solder balls are melted by heating in a reflow furnace, and the molten solder wets the microelectrode, so that solder bumps are formed on the microelectrodes. Thus, when solder balls are used, wettability with the electrode is required.

Conventionally, Sn—Ag—Cu solder alloys have been widely used, and are used in the form of solder balls as well as for die bonding. However, when this solder alloy is used, it may be necessary to improve heat cycle resistance, impact resistance, and discoloration resistance among various requirements in recent years. Therefore, in order to improve these characteristics, various studies have been made on Sn—Ag—Cu solder alloys that have been widely used conventionally.

For example, Patent Document 1 discloses an Sn—Ag—Cu solder alloy containing Co and/or Ni as optional elements as well as Ge and the like as a selective essential element. It is disclosed that this solder alloy exhibits heat cycle resistance when it contains Co and/or Ni, and exhibits impact resistance and/or discoloration resistance when it contains Ge.

Patent Document 1: JP 4144415 B2

SUMMARY

As described above, the solder alloy disclosed in Patent Document 1 is an excellent alloy which can simultaneously achieve the three kinds of effects, i.e. impact resistance, discoloration resistance, and heat cycle resistance. However, there seems to be room for further improvement with regard to alloy design.

Although each of elements has its specific significance to be added to the solder alloy, since a solder alloy is an integrated object formed by combination of all constituent elements and the constituent elements influence each other, the constituent elements need to be contained in a well-balanced manner as a whole. For the solder alloy as described in Patent Document 1, it seems that the contents of each constituent elements are individually optimized, and are sufficient for obtaining the effects as described in Patent Document 1 at the time of filing the Patent Document 1. However, in order to improve another property of a solder alloy containing the same constituent elements so as to adapt to recent demands, it is necessary to individually optimize the content of each constituent element, and further the constituent elements need to be contained in a well-balanced manner.

In the invention described in Patent Document 1, an alloy design is conducted on the assumption that a solder ball is placed on a microelectrode such as BGA. In addition, even when used for die bonding with a large bonding area, since breakage due to external stress cannot be ignored, improvement in the strength of the solder alloy itself is required. Furthermore, when performing soldering with a large bonding area such as die bonding, in addition to suppressing Ni leaching and diffusion of Ni, it is required to suppress generation of voids at a bonded interface.

As described above, due to recent higher integration, increased capacity, and higher speed of electronic devices, a solder alloy that can be applied not only to BGA but also to die bonding used in QFP has been required.

An objective of the present invention is to provide a solder alloy, a solder ball, Ball Grid Array, and a solder joint which have high tensile strength, can suppress Ni leaching and can suppress generation of voids at a bonded interface.

A solder alloy is composed of two or more kinds of elements, and the effects of these element kinds may individually affect the properties of the entire solder alloy. However, as described above, because all the constituent elements constitute an integral body, the constituent elements are related to each other. The present inventors have focused on alloy design by which high tensile strength is achieved and Ni leaching and generation of voids are suppressed so that the alloy design can be applied not only to BGA but also to QFP even for the same constituent elements as the solder alloy according to Patent Document 1. Specifically, under reconsideration of the significance of adding each of the constituent elements, the present inventors conducted a detailed search for composition under consideration of the balance of each of the constituent elements in order to achieve a high tensile strength and to suppress Ni leaching and generation of voids.

Furthermore, conventionally, in a case where Pb is used for a substrate and then landfilled, acid rain may cause Pb to elute and flow into groundwater. Then, it may affect the human body by accumulating in livestock and humans from groundwater. Therefore, Pb is designated as a regulated substance by the RoHS Directive. Furthermore, in recent years, for environmental and health reasons, there has been a growing demand to avoid the use of not only Pb but also Sb that may improve the heat-cycling properties of Sn-based solder alloys. Thus, we have investigated ways to achieve the desired properties in a lead-free and antimony-free condition.

First, a study was conducted to suppress Ni leaching in a Sn—Ag—Cu solder alloy. The present inventors assumed that Ni leaching would be suppressed if the liquidus temperature sharply increased due to an increase in the Ni content. That is, the present inventors have attempted an alloy design that minimizes Ni leaching even when Ni leaching may occur in an Ni-layer of a back metal. Specifically, a relationship between the Ni content, the temperature at which the liquidus temperature starts to rise, and the rate of increase in liquidus temperature is researched in detail so that the liquidus temperature rises sharply even when Ni content in the molten solder slightly increases. As a result, it was found that within a certain range of the Co content, the liquidus temperature rises sharply as it starts to rise when Ni content slightly increases. Therefore, the present inventors have focused on the fact that the content ratio of Co and Ni is required to suppress Ni leaching.

Here, the present inventors conducted a keen study not only to suppress Ni leaching during die bonding, but also to suppress Ni leaching more sufficiently so that Ni leaching can be suppressed even when solder bumps are formed on Cu electrodes with Ni plating.

One means of sufficiently suppressing Ni leaching is to suppress Ni diffusion at the bonded interface. In order to suppress the diffusion of Ni, the migration of Ni into the solder alloy should be inhibited. Here, because $(Cu,Ni)_6Sn_5$ is formed at the bonded interface and the crystal structure of this compound is distorted, the migration of Ni in the compound is suppressed and the migration of Ni to the solder alloy is inhibited. The present inventors have focused on Ge as an element that easily concentrates on the surface of a solder alloy and dissolves in Ni to distort the crystal structure of the compound. It was found that when Ge is a predetermined amount, Ge dissolves in Ni in the compound, the crystal structure of the compound is distorted, and the diffusion of Ni is suppressed.

Next, in order to suppress the generation of voids at the bonded interface, the present inventors focused on the Ge content. Ge is common as an element that incorporates oxygen in the atmosphere to form germanium oxide. Germanium oxide is formed as a hard and brittle oxide film on the surface of the molten solder. However, because this oxide film is easily destroyed by the convection of the molten solder itself and also by the external pressure applied to the molten solder at the timing when the chip is placed on the molten solder, it does not inhibit the convection of the molten solder.

Therefore, the solder alloy containing Ge makes it possible not only to suppress Ni leaching, but also to discharge voids generated at the bonded interface to the outside. Then, in the Sn—Ag—Cu—Ni—Co—Ge solder alloy, in order to suppress Ni leaching and generation of voids at a higher level, it is necessary to mix Co, Ni, and Ge in a well-balanced manner.

Furthermore, because $Ag_3Sn$ is precipitated at the grain boundaries by adding Ag and the strength of the solder alloy is improved, it is necessary to consider the balance of Ag content.

The present inventors have studied in detail the overall balance of Co and Ni content ratio, Ge content, and Ag content in Sn—Ag—Cu—Ni—Co—Ge solder alloy. As a result, it was found that such a solder alloy exhibits high tensile strength and suppresses Ni leaching and void generation, and present invention was completed based on this finding.

Furthermore, it was also found that the optimum mechanical properties for the form of the solder balls used for BGA can be obtained by intentionally adding an appropriate amount of Bi, which was conventionally considered to embrittle the solder alloy by solidification segregation. In addition to this, it was also found that the solder alloy can be suitably used as a solder ball in view of further suppressing Ni leaching and having capability of sufficient use for fine Cu electrodes with Ni plating because Bi distorts not only the crystal structure of $(Cu,Ni)_6Sn_5$ but also the Sn matrix in the solder alloy by dissolving in Sn and coexists with Ge.

The present inventions obtained from these finding are as follows.

(1) A lead-free and antimony-free solder alloy having an alloy composition consisting of, by mass %, Ag: 1.0 to 4.0%, Cu: 0.1 to 1.0%, Ni: 0.005 to 0.3%, Co: 0.003 to 0.1%, and Ge: 0.001 to 0.015% with the balance being Sn, wherein the alloy composition satisfies the following relation (1):

$$0.003 < (Ni/Co) \times (1/Ag) \times Ge < 0.05 \quad (1)$$

wherein Ni, Co, Ag, and Ge in the relation (1) each represent the contents (mass %) in the alloy composition.

(2) A lead-free and antimony-free solder alloy having an alloy composition consisting of, by mass %, Ag: 1.0 to 4.0%, Cu: 0.1 to 1.0%, Ni: 0.005 to 0.3%, Co: 0.005 to 0.1%, Ge: 0.001 to 0.015%, and Bi: 0.1 to 9.0% with the balance being Sn, wherein the alloy composition satisfies the following relation (1):

$$0.003 < (Ni/Co) \times (1/Ag) \times Ge < 0.05 \quad (1)$$

wherein Ni, Co, Ag, and Ge in the relation (1) each represent the contents (mass %) in the alloy composition.

(3) The lead-free and antimony-free solder alloy according to (2) above, wherein the Bi content is 1.0 to 5.0%.

(4) The lead-free and antimony-free solder alloy according to (2) above, wherein the Bi content is 2.0 to 4.0%.

(5) The lead-free and antimony-free solder alloy according to any one of (1) to (4) above, wherein the alloy composition further comprises one or more selected from the group consisting of Mn, Pd, Au, Pt, Cr, V, Mo, and Nb each with an upper limit of 0.01% by mass %.

(6) The lead-free and antimony-free solder alloy according to any one of (1) to (5) above, wherein the Ag content is 1.5 to 3.5%.

(7) The lead-free and antimony-free solder alloy according to any one of (1) to (5) above, wherein the Ag content is 2.0 to 3.0%.

(8) The lead-free and antimony-free solder alloy according to any one of (1) to (7) above, wherein ΔT, which is defined as a difference between a liquidus temperature and a solidus temperature, is 250° C. or less.

(9) The lead-free and antimony-free solder alloy according to any one of (1) to (7) above, wherein ΔT, which is defined as a difference between a liquidus temperature and a solidus temperature, is 120° C. or less.

(10) The lead-free and antimony-free solder alloy according to any one of (1) to (7) above, wherein ΔT, which is defined as a difference between a liquidus temperature and a solidus temperature, is 100° C. or less.

(11) The lead-free and antimony-free solder alloy according to any one of (1) to (10) above, wherein the alloy composition satisfies the following relation (2):

$$0.00150 \leq (Ni/Co) \times (1/Ag) \times Ge \leq 0.00833 \quad (2)$$

wherein Ni, Co, Ag, and Ge in the relation (2) each represent the contents (mass %) in the alloy composition.

(12) A solder ball comprising the lead-free and antimony-free solder alloy according to any one of (1) to (11) above.

(13) The solder ball according to (12) above, having an average particle diameter of 1 to 1000 μm.

(14) The solder ball according to (12) or (13) above, having a sphericity of 0.95 or more.

(15) The solder ball according to (12) or (13) above, having a sphericity of 0.99 or more.

(16) A ball grid array formed using the solder ball according to any one of (12) to (15) above.

(17) A solder joint comprising the lead-free and antimony-free solder alloy according to any one of (1) to (11) above.

(18) The lead-free and antimony-free solder alloy according to any one of (2) to (4) above, wherein the alloy composition further comprises Fe with an upper limit of 0.01% by mass %.

(19) The lead-free and antimony-free solder alloy according to (18) above, wherein the Ag content is 1.5 to 3.5%.

(20) The lead-free and antimony-free solder alloy according to (18) above, wherein the Ag content is 2.0 to 3.0%.

(21) The lead-free and antimony-free solder alloy according to any one of (18) to (20) above, wherein ΔT, which is defined as a difference between a liquidus temperature and a solidus temperature, is 250° C. or less.

(22) The lead-free and antimony-free solder alloy according to any one of (18) to (20) above, wherein ΔT, which is defined as a difference between a liquidus temperature and a solidus temperature, is 120° C. or less.

(23) The lead-free and antimony-free solder alloy according to any one of (18) to (20) above, wherein ΔT, which is defined as a difference between a liquidus temperature and a solidus temperature, is 100° C. or less.

(24) The lead-free and antimony-free solder alloy according to any one of (18) to (23) above, wherein the alloy composition satisfies the following relation (2):

$$0.00150 \leq (Ni/Co) \times (1/Ag) \times Ge \leq 0.00833 \quad (2)$$

wherein Ni, Co, Ag, and Ge in the relation (2) each represent the contents (mass %) in the alloy composition.

(25) A solder ball comprising the lead-free and antimony-free solder alloy according to any one of (18) to (24) above.

(26) The solder ball according to (25) above, having an average particle diameter of 1 to 1000 μm.

(27) The solder ball according to (25) or (26) above, having a sphericity of 0.95 or more.

(28) The solder ball according to (25) or (26) above, having a sphericity of 0.99 or more.

(29) A ball grid array formed using the solder ball according to any one of (25) to (28) above.

(30) A solder joint comprising the lead-free and antimony-free solder alloy according to any one of (18) to (24) above.

DETAILED DESCRIPTION

The present invention is described in more detail below. In the present description, "%" relating to the solder alloy composition refers to "mass %" unless otherwise specified.

1. Alloy Composition (1) Ag: 1.0 to 4.0%

Ag is an element that improves the strength of the solder alloy by precipitating fine $Ag_3Sn$ at the grain boundaries. If the Ag content is less than 1.0%, the effect of adding Ag is not sufficiently exhibited. In terms of the lower limit, the Ag content is 1.0% or more, preferably 1.5% or more, and more preferably 2.0% or more. On the other hand, if the Ag content is too large, coarse $Ag_3Sn$ is precipitated, whereby the strength is deteriorated. In terms of the upper limit, the Ag content is 4.0% or less, preferably 3.5% or less, more preferably 3.0% or less, more preferably 2.8% or less, particularly preferably 2.5% or less, and most preferably 2.4% or less.

(2) Cu: 0.1 to 1.0%

Cu is an element that can suppress Cu leaching and enable precipitation strengthening by $Cu_6Sn_5$. If the Cu content is less than 0.1%, since the precipitated amount of $Cu_6Sn_5$ is small and a brittle SnNi compound is precipitated, the solder alloy itself becomes brittle. In terms of the lower limit, the Cu content is 0.1% or more, preferably 0.2% or more, more preferably 0.3% or more, even more preferably 0.4% or more, and particularly preferably 0.5% or more. On the other hand, if the Cu content exceeds 1.0%, the liquidus temperature of the solder alloy is high and the solder alloy is difficult to melt. In terms of the upper limit, the Cu content is 1.0% or less, preferably 0.9% or less, more preferably 0.8% or less, and further preferably 0.7% or less.

(3) Ni: 0.005 to 0.3%

Ni is an element that can control a liquidus temperature of the solder alloy and suppress Ni leaching similarly to Cu. If the Ni content is less than 0.005%, the effect of adding Ni is difficult to exhibit. In terms of the lower limit, the Ni content is 0.005% or more, preferably 0.01% or more, more preferably 0.02% or more, even more preferably 0.03% or more, and particularly preferably 0.04% or more, and most preferably 0.05% or more. On the other hand, if the Ni content exceeds 0.3%, the liquidus temperature of the solder alloy is high and the solder alloy is difficult to melt. In terms of the upper limit, the Ni content is 0.3% or less, preferably 0.2% or less, more preferably 0.09% or less, even more preferably 0.08% or less, particularly preferably 0.07% or less, and most preferably 0.06% or less.

(4) Co: 0.0030 to 0.1%

Co is an element that controls the liquidus temperature of the solder alloy and contributes to minuteness of a structure of the solder alloy. When Co coexists in the presence of Ni, the liquidus temperature is increased even with a small amount of Ni-content and Ni leaching can be suppressed. If the Co content is less than 0.0030%, the effect of adding Co is difficult to exhibit. In terms of the lower limit, the Co content is 0.0030% or more, preferably 0.0050% or more, more preferably 0.0070% or more, and even more preferably 0.0080% or more. On the other hand, if the Co content exceeds 0.1%, the liquidus temperature of the solder alloy is high and the solder alloy is difficult to melt. In terms of the upper limit, the Co content is 0.1% or less, preferably 0.09% or less, more preferably 0.08% or less, even more preferably 0.05% or less, even yet more preferably 0.04% or less, particularly preferably 0.03% or less, most preferably 0.02% or less, and more particularly preferably 0.01% or less.

(5) Ge: 0.001 to 0.015%

Ge is an element that can inhibit the formation of strong tin oxide and improve wettability, because it forms hard and brittle germanium oxide. When Ge is not contained, tin oxide is formed on the surface of the molten solder. Because tin oxide is strong and hard to break, the molten solder is convected inside the tin oxide, then voids generated at the bonded interface are difficult to be discharged to the outside. On the other hand, Ge added to the solder alloy reacts with O in the atmosphere to form a hard and brittle oxide film on the surface of the molten solder. Because this oxide film is brittle, it is easily destroyed by the convection of the molten solder itself or the external force applied from the chip at the timing when the chip is placed. Therefore, the voids generated at the bonded interface are discharged to the outside by the convection of the molten solder.

In addition, Ge is an element that can be dissolved in Ni of $(Cu,Ni)_6Sn_5$ formed at the bonded interface to suppress Ni leaching. Because $(Cu,Ni)_6Sn_5$ is formed at the bonded interface, the crystal structure of this compound is distorted by Ge, so that the migration of Ni in the compound is suppressed and the migration of Ni to the solder alloy is inhibited. When Ge is not contained, the crystal structure of $(Cu,Ni)_6Sn_5$ is maintained in an aligned state, then Ni at the bonded interface diffuses into the solder alloy, and Ni leaching occurs.

When the Ge content is less than 0.001%, tin oxide is produced and the crystal structure of $(Cu,Ni)_6Sn_5$ is not distorted and the above effect is difficult to be exhibited. In terms of the lower limit, the Ge content is 0.001% or more, preferably 0.002% or more, and more preferably 0.003% or more. On the other hand, if the Ge content is too large, the liquidus temperature is high and the solder alloy is difficult to melt. In terms of the upper limit, the Ge content is 0.015% or less, preferably 0.01% or less, more preferably 0.008% or less, even more preferably 0.007% or less, particularly preferably 0.006% or less, and most preferably 0.005% or less.

(6) Bi: 0.1 to 9.0%

Bi may be an essential element in the solder alloy according to the present invention because the optimum mechanical properties can be obtained for the form of the solder ball used as BGA by adding a certain amount of Bi. A certain amount of Bi improves mechanical properties by solid solution strengthening. In addition, creep resistance and wettability can be improved. Furthermore, because Bi dissolves in Sn, the crystal structure of $(Cu,Ni)_6Sn_5$ is distorted, and by coexisting with Ge, Ni leaching can be further suppressed. If Bi is contained, in terms of the lower limit, the Bi content is 0.1% or more, preferably 0.5% or more, more preferably 1.0% or more, even more preferably 2.0% or more, and particularly preferably 3.0% or more.

On the other hand, if Bi is excessively added, the drop resistance may be deteriorated. Furthermore, because the solidus temperature is lowered while the liquidus temperature hardly changes, ΔT defined as a difference between a liquidus temperature and a solidus temperature becomes large. If ΔT becomes too large, segregation will occur during solidification, leading to deterioration of mechanical properties such as mechanical strength. Therefore, if Bi is contained, in terms of the upper limit, the Bi content is 9.0% or less, preferably 6.0% or less, more preferably 5.0% or less, and even more preferably 4.0% or less.

(7) Comprising One Or More Selected From The Group Consisting Of Mn, Pd, Au, Pt, Cr, Fe, V, Mo, And Nb Each With An Upper Limit Of 0.01%

The solder alloy according to the present application can comprise one or more selected from Mn, Pd, Au, Pt, Cr, Fe, V, Mo, and Nb, each with an upper limit of 0.01% as an optional element. These elements can improve mechanical properties.

(8) Balance: Sn

The balance of the solder alloy according to the present invention is Sn. In addition to the above-described elements, unavoidable impurities may be contained. Even if unavoidable impurities are contained, it does not affect the above-mentioned effects. Specific examples of the unavoidable impurities include As and Cd. Furthermore, although the present invention is lead-free and antimony-free, it does not exclude the inclusion of Pb and Sb as unavoidable impurities. If In is contained, the wettability deteriorates, and it is better not to contain it. Furthermore, Mn does not have to be contained because it is oxidized during the production of the solder alloy and it is difficult to produce the solder alloy.

(9) Relations (1) and (2)

The present invention satisfies the following relation (1):

$$0.00030 < (Ni/Co) \times (1/Ag) \times Ge < 0.05 \qquad (1)$$

In the above relation (1), Ni, P, Ag, and Co each represent the contents (mass %) in the alloy composition.

The solder alloy of the present invention can exhibit high tensile strength and suppress Ni leaching and voids because the balance of Ni, Co, Ag, and Ge contents is optimized by satisfying the relation (1).

For the Sn—Ag—Cu—Ni—Co—Ge solder alloy and the Sn—Ag—Cu—Ni—Co—Ge—Bi solder alloy according to the present invention, the balance between the contents of Ni, Co, Ag, and Ge need to be considered in order to achieve high tensile strength and suppress Ni leaching and generation of voids simultaneously.

More specifically, regarding Ni leaching, elution of Ni from the Ni layer can be suppressed if the liquidus temperature sharply increases even when the Ni content in the molten solder slightly increases. If Co and Ni coexist, the liquidus temperature sharply increases when the Ni content increases slightly. By utilizing this phenomenon, it is possible to minimize Ni leaching even when a slight elution of Ni from the Ni layer into the molten solder occurs. Therefore, from the viewpoint of controlling the liquidus temperature, the content ratio of the two must be specified in detail in the solder alloy according to the present invention.

As for voids, void discharging function by convection of the molten solder needs to be exhibited by paying attention to the properties of the oxide film formed on a surface of the molten solder. For maintaining this void discharge function, it is conceivable to prevent a strong tin oxide from being formed on the surface of the molten solder. However, because normal soldering is performed in the atmosphere, it is difficult to suppress formation itself of the oxide film. In a solder alloy containing Sn as a main component, a strong tin oxide film is formed on the surface of the molten solder during melting, and even if convection of the molten solder occurs, tin oxide film inhibits discharge of voids generated at the bonded interface. In contrary, in a solder alloy containing Ge, although a germanium oxide film is formed on a surface of the molten solder, the germanium oxide film is broken by the convection itself of the molten solder because it is thin, brittle, and hard. Thus, the void discharging function by convection of the molten solder is maintained. As a result, generation of voids is suppressed.

Furthermore, Ge dissolves in Ni of $(Cu,Ni)_6Sn_5$ formed at the bonded interface, the migration of Ni in this compound is suppressed and the migration of Ni to the solder alloy is inhibited. As a result, Ni leaching is also suppressed.

In addition to this, it is necessary to improve the strength of the solder alloy in the present invention. Formation of $Ag_3Sn$ by adding Ag improves the strength of the solder alloy, and simultaneously, minuteness of the alloy structure by Co improves the strength of the solder alloy. If one of them is too much, the liquidus temperature rises, for example, it does not melt at about 240° C., so that a solder joint cannot be formed. If one of them is too little, the strength of the solder alloy cannot be achieved. In addition to this, an amount of precipitated $Ag_3Sn$ in the solder alloy according to the present invention depends on whether Ag-content is within the range described above, and may further depend directly or indirectly on the balance of these elements due to the properties of the alloy. Furthermore, it is to be noted that, for the solder alloy according to the present invention, it is not necessary to consider Cu in the relation (1), because precipitation strengthening by $Cu_6Sn_5$ does not contribute as much as strength improvement by $Ag_3Sn$.

Consequently, the solder alloy according to the present invention needs to satisfy the relation (1) in order to achieve all of the three factors, i.e. high tensile strength, suppression of Ni leaching, and suppression of void generation. In addition to the Sn—Ag—Cu—Ni—Co—Ge solder alloy, even if the solder alloy is the Sn—Ag—Cu—Ni—Co—Ge—Bi solder alloy, at least one of the above effects cannot be achieved as long as the relation (1) is not satisfied.

In terms of the lower limit, the relation (1) is more than 0.00030, preferably 0.00042 or more, 0.00063 or more, 0.00074 or more, 0.00150 or more, 0.00167 or more, 0.00208 or more, 0.00250 or more.

On the other hand, in terms of the upper limit, the relation (1) is less than 0.05, and preferably 0.01667 or less, 0.01500 or less, 0.01333 or less, 0.01167 or less, 0.01042 or less, 0.01000 or less, 0.00833 or less, 0.00667 or less, 0.0050 or less, 0.00389 or less, 0.00333 or less, 0.00292 or less.

In order to more sufficiently exhibit the effect of the relation (1), the relation (1) is preferably the following relation (2):

$$0.00150 \leq (Ni/Co) \times (1/Ag) \times Ge \leq 0.00833 \quad (2)$$

In the above relation (2), Ni, Ge, Ag, and Co each represent the contents (mass %) in the alloy composition.

(10) Liquidus Temperature, Solidus Temperature, and ΔT of Solder Alloy

The solder alloy according to the present invention is preferable because reduction of flowability of the molten solder is suppressed due to a different precipitated state of a solid phase although the solder alloy has a higher liquidus temperature than Sn—Ag—Cu solder alloy, so that voids can be discharged to the outside by convection of the molten solder. The liquidus temperature in the present invention is preferably 350° C. or less, more preferably 290° C. or less, even more preferably 270° C. or less, particularly preferably 250° C. or less, and most preferably 240° C. or less. The liquidus temperature of 240° C. or less is preferable, because soldering can be performed at a heating temperature of about 240° C. which is similar to that of an Sn—Ag—Cu solder alloy which is conventionally widely used.

The solidus temperature of the solder alloy according to the present invention is not particularly limited, but the solidus temperature may be at least 150° C. or more in order that 66 T, which is defined as a temperature difference between a liquidus temperature and a solidus temperature, does not become too large.

Furthermore, it is preferable that ΔT is within a certain range because the solid-liquid coexistence region is narrow, and for example, segregation of the alloy structure during solidification can be suppressed. The range of ΔT is preferably 250° C. or less, more preferably 120° C. or less, and even more preferably 100° C. or less.

3. Solder Ball

The lead-free and antimony-free solder alloy according to the present invention is most suitable for the form of solder balls used for BGA by adding an appropriate amount of Bi. The sphericity of the solder ball is preferably 0.90 or more, more preferably 0.95 or more, and most preferably 0.99 or more. The sphericity is determined by various methods such as the least squares circle method (LSC method), the minimum zone circle method (MZC method), the maximum inscribed circle method (MIC method), and the minimum circumscribed circle method (MCC method). In the present invention, the sphericity of the solder ball is measured using a CNC image measuring system (Ultra Quick Vision ULTRA QV350-PRO measuring device manufactured by Mitutoyo Co., Ltd.) using the minimum zone circle method (MZC method). In the present invention, the sphericity represents a deviation from the true sphere, and for example, the sphericity is an arithmetic mean value calculated when the diameter of each of 500 balls is divided by the major axis. The closer the value of the sphericity is to the upper limit of 1.00, the closer it is to a true sphere.

The solder balls according to the present invention are used for forming bumps on electrodes and substrates of semiconductor packages such as BGA (ball grid array). The diameter of the solder ball according to the present invention is preferably in the range of 1 to 1000 μm, more preferably 50 to 300 μm. The solder ball can be manufactured by a general solder ball manufacturing method. The diameter in the present invention means the diameter measured by Ultra Quick Vision ULTRA QV350-PRO measuring device manufactured by Mitutoyo Co., Ltd.

4. Solder Joint

The solder joint according to the present invention is suitable for connection between an IC chip for a semiconductor package and its substrate (interposer), or for connection between the semiconductor package and a printed wiring board. Here, the term "solder joint" is defined as a connection part between an IC chip and a substrate, and the connection part includes a connection for an electrode or a connection part between a die and the substrate.

5. Other

A bonding method using a solder alloy according to the present invention may be performed according to an ordinary method e.g. using a reflow method. The heating temperature may be appropriately adjusted depending on a heat resistance of the chip or the liquidus temperature of the solder alloy. About 240° C. is preferable as the heating temperature from the viewpoint of suppressing thermal damage to the chip. A melting temperature of the solder alloy for performing flow soldering may be approximately 20° C. higher than the liquidus temperature. In a case where bonding is conducted by using the solder alloy according to the present invention, the structure can be further made minuteness by considering a cooling rate during solidification. For example, the solder joint is cooled at a cooling rate of 2 to 3° C./s or higher. Other bonding conditions can be appropriately adjusted depending on the alloy composition of the solder alloy.

The solder alloy according to the present invention enables a low α-ray alloy to be produced by using a low α-ray material as a raw material therefor. When such a low α-ray-alloy is used for forming solder bumps in the periphery of a memory, soft errors can be suppressed.

EXAMPLES

For the solder alloys constituted from alloy compositions as shown in Tables 1 to 9, ΔT obtained from the liquidus line temperature and the solidus line temperature, Ni leaching, and the presence or absence of voids were evaluated as follows. The tensile strength was also evaluated.

(1) ΔT (K)

Each solder alloy as shown in Tables 1 to 9 was prepared, and the melting temperature of the solder was measured. The measurement of the solidus temperature was performed according to JIS Z3198-1. The liquidus temperature was measured, instead of JIS Z3198-1, with a method with DSC which is similar to the measurement method for a solidus temperature according to JIS Z3198-1. ΔT (K), which is the difference between the measured liquidus temperature and solidus temperature, was determined. When ΔT (K) was less than 100K, it was rated as "S", when it was 100 to 120K, it was rated as "A", when it was over 120K and 250K or less, it was rated as "B" and when it was over 250K, it was rated as "D".

(2) Ni Leaching

A preform with a thickness of 250 μm and made of alloy composition as shown in Tables 1 to 9 was mounted on a Cu lead frame. Thereafter, an IC chip having a back metal on the side of a substrate bonded surface of a silicon chip of 5 mm×5 mm×200 μm$^t$ was mounted on the solder alloy. The back metal is obtained by sequentially stacking a 0.05 μm Ti layer as a barrier layer, and a 0.20 μm Ni layer. The mounting was performed in such an orientation that in the IC chip having the back metal, the Ni layer was in contact with the solder alloy. A substrate with the solder alloy and the IC chip mounted thereon was heated in a reflow furnace so that the peak temperature was 240° C., then die bonding was performed.

Then, a cross section of an obtained lead frame was zoomed up by a factor of 30000 on a SEM monitor, and an average value of a film thickness of an Ni layer was calculated from arbitrary 10 locations. When an average value of the film thickness was 40% or more of an initial film thickness, it was rated as "A", when the average value of the film thickness was 20% or more, it was rated as "B", and when the average value of the film thickness was less than 10%, it was rated as "D".

(3) Void

For the cross section of the lead frame prepared in the above (2), a radiograph of the solder bonded section was taken using an X-ray radioscopic device. Then, an area ratio of voids generated at a solder joint interface was calculated. When average value of the void area ratio was 10% or less, it was rated as good (B), when the average value of the void area ratio was over 10% and 25% or less, it was rated as relatively poor (C), and when the average value of the void area ratio was over 25%, it was rated as bad (D).

TABLE 1

| | Alloy Composition (mass %) | | | | | | Relation | ΔT | Ni | |
|---|---|---|---|---|---|---|---|---|---|---|
| | Sn | Ag | Cu | Ni | Co | Ge | (1) | (K) | leaching | void |
| Ex. 1 | Bal. | 3.0 | 0.4 | 0.01 | 0.01 | 0.005 | 0.00167 | S | B | B |
| Ex. 2 | Bal. | 3.0 | 0.4 | 0.03 | 0.01 | 0.005 | 0.00500 | S | B | B |
| Ex. 3 | Bal. | 3.0 | 0.5 | 0.04 | 0.01 | 0.005 | 0.00667 | S | B | B |
| Ex. 4 | Bal. | 2.4 | 0.4 | 0.05 | 0.01 | 0.005 | 0.01042 | S | B | B |
| Ex. 5 | Bal. | 3.0 | 0.4 | 0.06 | 0.01 | 0.005 | 0.01000 | S | B | B |
| Ex. 6 | Bal. | 3.0 | 0.5 | 0.08 | 0.01 | 0.005 | 0.01333 | S | B | B |
| Ex. 7 | Bal. | 3.0 | 0.5 | 0.01 | 0.04 | 0.005 | 0.00042 | S | B | B |
| Ex. 8 | Bal. | 3.0 | 0.5 | 0.02 | 0.04 | 0.005 | 0.00083 | S | B | B |
| Ex. 9 | Bal. | 3.0 | 0.4 | 0.03 | 0.02 | 0.005 | 0.00250 | S | B | B |
| Ex. 10 | Bal. | 3.0 | 0.5 | 0.03 | 0.02 | 0.003 | 0.00150 | S | B | B |
| Ex. 11 | Bal. | 3.0 | 0.5 | 0.04 | 0.01 | 0.003 | 0.00400 | S | B | B |
| Ex. 12 | Bal. | 3.0 | 0.5 | 0.05 | 0.01 | 0.003 | 0.00500 | S | B | B |
| Ex. 13 | Bal. | 3.0 | 0.5 | 0.04 | 0.02 | 0.005 | 0.00333 | S | B | B |
| Ex. 14 | Bal. | 3.0 | 0.4 | 0.05 | 0.02 | 0.005 | 0.00417 | S | B | B |
| Ex. 15 | Bal. | 3.0 | 0.5 | 0.07 | 0.03 | 0.005 | 0.00389 | S | B | B |
| Ex. 16 | Bal. | 2.8 | 0.5 | 0.07 | 0.03 | 0.005 | 0.00417 | S | B | B |
| Ex. 17 | Bal. | 3.0 | 0.4 | 0.03 | 0.08 | 0.005 | 0.00063 | S | B | B |
| Ex. 18 | Bal. | 3.0 | 0.4 | 0.04 | 0.09 | 0.005 | 0.00074 | S | B | B |
| Ex. 19 | Bal. | 3.0 | 0.5 | 0.05 | 0.05 | 0.005 | 0.00167 | A | B | B |
| Ex. 20 | Bal. | 3.0 | 0.7 | 0.03 | 0.01 | 0.005 | 0.00500 | S | B | B |
| Ex. 21 | Bal. | 3.0 | 0.7 | 0.05 | 0.01 | 0.005 | 0.00833 | S | B | B |
| Ex. 22 | Bal. | 3.0 | 0.7 | 0.09 | 0.01 | 0.005 | 0.01500 | S | B | B |
| Ex. 23 | Bal. | 3.0 | 0.7 | 0.03 | 0.03 | 0.005 | 0.00167 | S | B | B |
| Ex. 24 | Bal. | 3.0 | 0.7 | 0.05 | 0.04 | 0.005 | 0.00208 | S | B | B |
| Ex. 25 | Bal. | 3.0 | 0.7 | 0.07 | 0.03 | 0.005 | 0.00389 | S | B | B |
| Ex. 26 | Bal. | 1.0 | 0.7 | 0.07 | 0.03 | 0.005 | 0.01167 | S | B | B |
| Ex. 27 | Bal. | 3.0 | 0.1 | 0.07 | 0.03 | 0.005 | 0.00389 | A | B | B |
| Ex. 28 | Bal. | 4.0 | 0.5 | 0.07 | 0.03 | 0.005 | 0.00292 | A | B | B |
| Ex. 29 | Bal. | 3.0 | 0.5 | 0.005 | 0.005 | 0.005 | 0.01667 | S | B | B |
| Ex. 30 | Bal. | 3.0 | 0.4 | 0.01 | 0.01 | 0.015 | 0.00500 | S | B | B |
| Ex. 31 | Bal. | 3.0 | 1.0 | 0.04 | 0.01 | 0.003 | 0.00400 | S | B | B |
| Comp. Ex. 1 | Bal. | 1.0 | 0.5 | 0.05 | 0.01 | 0.015 | 0.07500 | S | B | D |
| Comp. Ex. 2 | Bal. | 3.0 | 0.5 | 0.005 | 0.01 | 0.001 | 0.00017 | S | D | B |
| Comp. Ex. 3 | Bal. | 3.0 | 0.5 | 0.05 | 0.2 | 0.003 | 0.00025 | D | — | — |
| Comp. Ex. 4 | Bal. | 0.1 | 0.5 | 0.01 | 0.02 | 0.003 | 0.01500 | S | B | B |

TABLE 1-continued

|  | Alloy Composition (mass %) | | | | | | Relation (1) | ΔT (K) | Ni leaching | void |
|---|---|---|---|---|---|---|---|---|---|---|
|  | Sn | Ag | Cu | Ni | Co | Ge | | | | |
| Comp. Ex. 5 | Bal. | 5.0 | 0.5 | 0.03 | 0.02 | 0.003 | 0.00090 | S | B | B |
| Comp. Ex. 6 | Bal. | 3.0 | 0.5 | 0.001 | 0.02 | 0.015 | 0.00025 | S | D | B |
| Comp. Ex. 7 | Bal. | 3.0 | 0.5 | 1.0 | 0.1 | 0.003 | 0.01000 | D | — | — |

Ex = Example
Comp. Ex. = Comparative Example
The underline indicates that it does not fall within the scope of the present invention.

TABLE 2

|  | Alloy Composition (mass %) | | | | | | | Relation (1) | ΔT (K) | Ni leaching | void |
|---|---|---|---|---|---|---|---|---|---|---|---|
|  | Sn | Ag | Cu | Ni | Co | Ge | Bi | | | | |
| Ex. 32 | Bal. | 3.0 | 0.4 | 0.01 | 0.01 | 0.005 | 0.1 | 0.00167 | S | B | B |
| Ex. 33 | Bal. | 3.0 | 0.4 | 0.03 | 0.01 | 0.005 | 0.1 | 0.00500 | S | B | B |
| Ex. 34 | Bal. | 3.0 | 0.5 | 0.04 | 0.01 | 0.005 | 0.1 | 0.00667 | S | B | B |
| Ex. 35 | Bal. | 3.0 | 0.4 | 0.05 | 0.01 | 0.005 | 0.1 | 0.00833 | S | B | B |
| Ex. 36 | Bal. | 3.0 | 0.5 | 0.08 | 0.01 | 0.005 | 0.1 | 0.01333 | S | B | B |
| Ex. 37 | Bal. | 3.0 | 0.5 | 0.01 | 0.04 | 0.005 | 0.1 | 0.00042 | S | B | B |
| Ex. 38 | Bal. | 3.0 | 0.4 | 0.03 | 0.02 | 0.005 | 0.1 | 0.00250 | S | B | B |
| Ex. 39 | Bal. | 3.0 | 0.5 | 0.03 | 0.02 | 0.003 | 0.1 | 0.00150 | S | B | B |
| Ex. 40 | Bal. | 3.0 | 0.5 | 0.05 | 0.01 | 0.003 | 0.1 | 0.00500 | S | B | B |
| Ex. 41 | Bal. | 3.0 | 0.5 | 0.04 | 0.02 | 0.005 | 0.1 | 0.00333 | S | B | B |
| Ex. 42 | Bal. | 3.0 | 0.4 | 0.05 | 0.02 | 0.005 | 0.1 | 0.00417 | S | B | B |
| Ex. 43 | Bal. | 3.0 | 0.5 | 0.07 | 0.03 | 0.005 | 0.1 | 0.00389 | S | B | B |
| Ex. 44 | Bal. | 3.0 | 0.4 | 0.04 | 0.09 | 0.005 | 0.1 | 0.00074 | S | B | B |
| Ex. 45 | Bal. | 3.0 | 0.5 | 0.05 | 0.05 | 0.005 | 0.1 | 0.00167 | A | B | B |
| Ex. 46 | Bal. | 3.0 | 0.7 | 0.03 | 0.01 | 0.005 | 0.1 | 0.00500 | S | B | B |
| Ex. 47 | Bal. | 3.0 | 0.7 | 0.09 | 0.01 | 0.005 | 0.1 | 0.01500 | S | B | B |
| Ex. 48 | Bal. | 3.0 | 0.7 | 0.03 | 0.03 | 0.005 | 0.1 | 0.00167 | S | B | B |
| Ex. 49 | Bal. | 3.0 | 0.7 | 0.05 | 0.04 | 0.005 | 0.1 | 0.00208 | S | B | B |
| Ex. 50 | Bal. | 3.0 | 0.7 | 0.07 | 0.03 | 0.005 | 0.1 | 0.00389 | S | B | B |
| Ex. 51 | Bal. | 1.0 | 0.7 | 0.07 | 0.03 | 0.005 | 0.1 | 0.01167 | A | B | B |
| Ex. 52 | Bal. | 3.0 | 0.1 | 0.07 | 0.03 | 0.005 | 0.1 | 0.00389 | A | B | B |
| Ex. 53 | Bal. | 4.0 | 0.5 | 0.07 | 0.03 | 0.005 | 0.1 | 0.00292 | A | B | B |
| Ex. 54 | Bal. | 3.0 | 0.5 | 0.05 | 0.005 | 0.005 | 0.1 | 0.01667 | S | B | B |
| Ex. 55 | Bal. | 3.0 | 0.4 | 0.01 | 0.01 | 0.015 | 0.1 | 0.00500 | S | B | B |
| Ex. 56 | Bal. | 3.0 | 1.0 | 0.04 | 0.01 | 0.003 | 0.1 | 0.00400 | S | B | B |
| Comp. Ex. 8 | Bal. | 1.0 | 0.5 | 0.05 | 0.01 | 0.015 | 0.1 | 0.07500 | S | B | D |
| Comp. Ex. 9 | Bal. | 3.0 | 0.5 | 0.005 | 0.01 | 0.001 | 0.1 | 0.00017 | S | D | B |
| Comp. Ex. 10 | Bal. | 3.0 | 0.5 | 0.05 | 0.2 | 0.003 | 0.1 | 0.00025 | D | — | — |
| Comp. Ex. 11 | Bal. | 0.1 | 0.5 | 0.01 | 0.02 | 0.003 | 0.1 | 0.01500 | S | B | B |
| Comp. Ex. 12 | Bal. | 5.0 | 0.5 | 0.03 | 0.02 | 0.003 | 0.1 | 0.00090 | S | B | B |
| Comp. Ex. 13 | Bal. | 3.0 | 0.5 | 0.001 | 0.02 | 0.015 | 0.1 | 0.00025 | S | D | B |
| Comp. Ex. 14 | Bal. | 3.0 | 0.5 | 1.0 | 0.1 | 0.003 | 0.1 | 0.01000 | D | — | — |

Ex = Example
Comp. Ex. = Comparative Example
The underline indicates that it does not fall within the scope of the present invention.

TABLE 3

|  | Alloy Composition (mass %) | | | | | | | Relation (1) | ΔT (K) | Ni leaching | void |
|---|---|---|---|---|---|---|---|---|---|---|---|
|  | Sn | Ag | Cu | Ni | Co | Ge | Bi | | | | |
| Ex. 57 | Bal. | 3.0 | 0.4 | 0.01 | 0.01 | 0.005 | 0.5 | 0.00167 | S | B | B |
| Ex. 58 | Bal. | 3.0 | 0.5 | 0.04 | 0.01 | 0.005 | 0.5 | 0.00667 | S | B | B |
| Ex. 59 | Bal. | 3.0 | 0.4 | 0.06 | 0.01 | 0.005 | 0.5 | 0.01000 | S | B | B |
| Ex. 60 | Bal. | 3.0 | 0.5 | 0.01 | 0.04 | 0.005 | 0.5 | 0.00042 | S | B | B |
| Ex. 61 | Bal. | 3.0 | 0.4 | 0.03 | 0.02 | 0.005 | 0.5 | 0.00250 | S | B | B |
| Ex. 62 | Bal. | 3.0 | 0.5 | 0.04 | 0.01 | 0.003 | 0.5 | 0.00400 | S | B | B |
| Ex. 63 | Bal. | 3.0 | 0.5 | 0.04 | 0.02 | 0.005 | 0.5 | 0.00333 | S | B | B |
| Ex. 64 | Bal. | 3.0 | 0.5 | 0.07 | 0.03 | 0.005 | 0.5 | 0.00389 | S | B | B |
| Ex. 65 | Bal. | 3.0 | 0.4 | 0.03 | 0.08 | 0.005 | 0.5 | 0.00063 | S | B | B |
| Ex. 66 | Bal. | 3.0 | 0.5 | 0.05 | 0.05 | 0.005 | 0.5 | 0.00167 | A | B | B |
| Ex. 67 | Bal. | 3.0 | 0.7 | 0.05 | 0.01 | 0.005 | 0.5 | 0.00833 | S | B | B |
| Ex. 68 | Bal. | 3.0 | 0.7 | 0.03 | 0.03 | 0.005 | 0.5 | 0.00167 | S | B | B |

TABLE 3-continued

|  | Alloy Composition (mass %) | | | | | | Relation (1) | ΔT (K) | Ni leaching | void |
| --- | --- | --- | --- | --- | --- | --- | --- | --- | --- | --- |
|  | Sn | Ag | Cu | Ni | Co | Ge | Bi |  |  |  |  |
| Ex. 69 | Bal. | 3.0 | 0.7 | 0.07 | 0.03 | 0.005 | 0.5 | 0.00389 | S | B | B |
| Ex. 70 | Bal. | 3.0 | 0.1 | 0.07 | 0.03 | 0.005 | 0.5 | 0.00389 | A | B | B |
| Ex. 71 | Bal. | 3.0 | 0.5 | 0.05 | 0.005 | 0.005 | 0.5 | 0.01667 | S | B | B |
| Ex. 72 | Bal. | 3.0 | 1.0 | 0.04 | 0.01 | 0.003 | 0.5 | 0.00400 | S | B | B |

Ex = Example
Comp. Ex. = Comparative Example
The underline indicates that it does not fall within the scope of the present invention.

TABLE 4

|  | Alloy Composition (mass %) | | | | | | Relation (1) | ΔT (K) | Ni leaching | void |
| --- | --- | --- | --- | --- | --- | --- | --- | --- | --- | --- |
|  | Sn | Ag | Cu | Ni | Co | Ge | Bi |  |  |  |  |
| Ex. 73 | Bal. | 3.0 | 0.4 | 0.03 | 0.01 | 0.005 | 1.0 | 0.00500 | S | B | B |
| Ex. 74 | Bal. | 3.0 | 0.4 | 0.05 | 0.01 | 0.005 | 1.0 | 0.00833 | S | B | B |
| Ex. 75 | Bal. | 3.0 | 0.5 | 0.08 | 0.01 | 0.005 | 1.0 | 0.01333 | S | B | B |
| Ex. 76 | Bal. | 3.0 | 0.5 | 0.02 | 0.04 | 0.005 | 1.0 | 0.00083 | S | B | B |
| Ex. 77 | Bal. | 3.0 | 0.5 | 0.03 | 0.02 | 0.003 | 1.0 | 0.00150 | S | B | B |
| Ex. 78 | Bal. | 3.0 | 0.5 | 0.05 | 0.01 | 0.003 | 1.0 | 0.00500 | S | B | B |
| Ex. 79 | Bal. | 3.0 | 0.4 | 0.05 | 0.02 | 0.005 | 1.0 | 0.00417 | S | B | B |
| Ex. 80 | Bal. | 3.0 | 0.5 | 0.07 | 0.03 | 0.005 | 1.0 | 0.00389 | S | B | B |
| Ex. 81 | Bal. | 3.0 | 0.4 | 0.04 | 0.09 | 0.005 | 1.0 | 0.00074 | S | B | B |
| Ex. 82 | Bal. | 3.0 | 0.7 | 0.03 | 0.01 | 0.005 | 1.0 | 0.00500 | S | B | B |
| Ex. 83 | Bal. | 3.0 | 0.7 | 0.09 | 0.01 | 0.005 | 1.0 | 0.01500 | S | B | B |
| Ex. 84 | Bal. | 3.0 | 0.7 | 0.05 | 0.04 | 0.006 | 1.0 | 0.00250 | S | B | B |
| Ex. 85 | Bal. | 1.0 | 0.7 | 0.07 | 0.03 | 0.005 | 1.0 | 0.01167 | A | B | B |
| Ex. 86 | Bal. | 4.0 | 0.5 | 0.07 | 0.03 | 0.005 | 1.0 | 0.00292 | A | B | B |
| Ex. 87 | Bal. | 3.0 | 0.4 | 0.01 | 0.01 | 0.015 | 1.0 | 0.00500 | S | B | B |

Ex = Example
Comp. Ex. = Comparative Example
The underline indicates that it does not fall within the scope of the present invention.

TABLE 5

|  | Alloy Composition (mass %) | | | | | | Relation (1) | ΔT (K) | Ni leaching | void |
| --- | --- | --- | --- | --- | --- | --- | --- | --- | --- | --- |
|  | Sn | Ag | Cu | Ni | Co | Ge | Bi |  |  |  |  |
| Ex. 88 | Bal. | 3.0 | 0.4 | 0.01 | 0.01 | 0.005 | 2.0 | 0.00167 | S | B | B |
| Ex. 89 | Bal. | 3.0 | 0.4 | 0.03 | 0.01 | 0.005 | 2.0 | 0.00500 | S | B | B |
| Ex. 90 | Bal. | 3.0 | 0.4 | 0.05 | 0.01 | 0.005 | 2.0 | 0.00833 | S | B | B |
| Ex. 91 | Bal. | 3.0 | 0.4 | 0.06 | 0.01 | 0.005 | 2.0 | 0.01000 | S | B | B |
| Ex. 92 | Bal. | 2.5 | 0.8 | 0.08 | 0.008 | 0.008 | 2.0 | 0.03200 | S | B | B |
| Ex. 93 | Bal. | 3.0 | 0.5 | 0.01 | 0.04 | 0.005 | 2.0 | 0.00042 | S | B | B |
| Ex. 94 | Bal. | 3.0 | 0.5 | 0.02 | 0.04 | 0.005 | 2.0 | 0.00083 | S | B | B |
| Ex. 95 | Bal. | 3.0 | 0.5 | 0.03 | 0.02 | 0.003 | 2.0 | 0.00150 | S | B | B |
| Ex. 96 | Bal. | 3.0 | 0.5 | 0.04 | 0.01 | 0.003 | 2.0 | 0.00400 | S | B | B |
| Ex. 97 | Bal. | 3.0 | 0.5 | 0.04 | 0.02 | 0.005 | 2.0 | 0.00333 | S | B | B |
| Ex. 98 | Bal. | 3.0 | 0.4 | 0.05 | 0.02 | 0.005 | 2.0 | 0.00417 | S | B | B |
| Ex. 99 | Bal. | 3.0 | 0.5 | 0.07 | 0.03 | 0.005 | 2.0 | 0.00389 | S | B | B |
| Ex. 100 | Bal. | 3.0 | 0.4 | 0.03 | 0.08 | 0.005 | 2.0 | 0.00063 | S | B | B |
| Ex. 101 | Bal. | 3.0 | 0.5 | 0.05 | 0.05 | 0.005 | 2.0 | 0.00167 | B | B | B |
| Ex. 102 | Bal. | 3.0 | 0.7 | 0.03 | 0.01 | 0.005 | 2.0 | 0.00500 | S | B | B |
| Ex. 103 | Bal. | 3.0 | 0.7 | 0.09 | 0.01 | 0.005 | 2.0 | 0.01500 | S | B | B |
| Ex. 104 | Bal. | 3.0 | 0.7 | 0.03 | 0.03 | 0.005 | 2.0 | 0.00167 | S | B | B |
| Ex. 105 | Bal. | 3.0 | 0.7 | 0.07 | 0.03 | 0.005 | 2.0 | 0.00389 | A | B | B |
| Ex. 106 | Bal. | 1.0 | 0.7 | 0.07 | 0.03 | 0.005 | 2.0 | 0.01167 | A | B | B |
| Ex. 107 | Bal. | 4.0 | 0.5 | 0.07 | 0.03 | 0.005 | 2.0 | 0.00292 | A | B | B |
| Ex. 108 | Bal. | 3.0 | 0.5 | 0.05 | 0.005 | 0.005 | 2.0 | 0.01667 | S | B | B |
| Ex. 109 | Bal. | 3.0 | 1.0 | 0.04 | 0.01 | 0.003 | 2.0 | 0.00400 | S | B | B |
| Comp. Ex. 15 | Bal. | 1.0 | 0.5 | 0.05 | 0.01 | 0.015 | 2.0 | 0.07500 | S | B | D |
| Comp. Ex. 16 | Bal. | 3.0 | 0.5 | 0.005 | 0.01 | 0.001 | 2.0 | 0.00017 | S | D | B |

Ex = Example
Comp. Ex. = Comparative Example
The underline indicates that it does not fall within the scope of the present invention.

TABLE 6

| | Alloy Composition (mass %) | | | | | | Relation (1) | ΔT (K) | Ni leaching | void |
|---|---|---|---|---|---|---|---|---|---|---|
| | Sn | Ag | Cu | Ni | Co | Ge | Bi | | | | |
| Ex. 110 | Bal. | 3.0 | 0.4 | 0.01 | 0.01 | 0.005 | 3.0 | 0.00167 | S | B | B |
| Ex. 111 | Bal. | 3.0 | 0.4 | 0.03 | 0.01 | 0.005 | 3.0 | 0.00500 | S | B | B |
| Ex. 112 | Bal. | 3.0 | 0.5 | 0.04 | 0.01 | 0.005 | 3.0 | 0.00667 | S | B | B |
| Ex. 113 | Bal. | 3.0 | 0.4 | 0.06 | 0.01 | 0.005 | 3.0 | 0.01000 | S | B | B |
| Ex. 114 | Bal. | 3.0 | 0.5 | 0.08 | 0.01 | 0.005 | 3.0 | 0.01333 | S | B | B |
| Ex. 115 | Bal. | 3.0 | 0.5 | 0.01 | 0.04 | 0.005 | 3.0 | 0.00042 | S | B | B |
| Ex. 116 | Bal. | 3.0 | 0.4 | 0.03 | 0.02 | 0.005 | 3.0 | 0.00250 | S | B | B |
| Ex. 117 | Bal. | 3.0 | 0.5 | 0.03 | 0.02 | 0.003 | 3.0 | 0.00150 | S | B | B |
| Ex. 118 | Bal. | 3.0 | 0.5 | 0.04 | 0.01 | 0.003 | 3.0 | 0.00400 | S | B | B |
| Ex. 119 | Bal. | 3.0 | 0.5 | 0.04 | 0.02 | 0.005 | 3.0 | 0.00333 | S | B | B |
| Ex. 120 | Bal. | 3.0 | 0.4 | 0.05 | 0.02 | 0.005 | 3.0 | 0.00417 | S | B | B |
| Ex. 121 | Bal. | 3.0 | 0.5 | 0.07 | 0.03 | 0.005 | 3.0 | 0.00389 | S | B | B |
| Ex. 122 | Bal. | 3.0 | 0.4 | 0.03 | 0.08 | 0.005 | 3.0 | 0.00063 | S | B | B |
| Ex. 123 | Bal. | 3.0 | 0.4 | 0.04 | 0.09 | 0.005 | 3.0 | 0.00074 | S | B | B |
| Ex. 124 | Bal. | 3.0 | 0.5 | 0.05 | 0.05 | 0.005 | 3.0 | 0.00167 | B | B | B |
| Ex. 125 | Bal. | 3.0 | 0.7 | 0.05 | 0.01 | 0.005 | 3.0 | 0.00833 | S | B | B |
| Ex. 126 | Bal. | 2.5 | 0.7 | 0.09 | 0.01 | 0.005 | 3.0 | 0.01800 | S | B | B |
| Ex. 127 | Bal. | 3.0 | 0.7 | 0.03 | 0.03 | 0.005 | 3.0 | 0.00167 | S | B | B |
| Ex. 128 | Bal. | 3.0 | 0.7 | 0.07 | 0.03 | 0.005 | 3.0 | 0.00389 | A | B | B |
| Ex. 129 | Bal. | 1.0 | 0.7 | 0.07 | 0.03 | 0.005 | 3.0 | 0.01167 | A | B | B |
| Ex. 130 | Bal. | 3.0 | 0.1 | 0.07 | 0.03 | 0.005 | 3.0 | 0.00389 | B | B | B |
| Ex. 131 | Bal. | 3.0 | 0.5 | 0.05 | 0.005 | 0.005 | 3.0 | 0.01667 | S | B | B |
| Ex. 132 | Bal. | 3.0 | 0.4 | 0.01 | 0.01 | 0.015 | 3.0 | 0.00500 | S | B | B |
| Ex. 133 | Bal. | 3.0 | 1.0 | 0.04 | 0.01 | 0.003 | 3.0 | 0.00400 | S | B | B |
| Comp. Ex. 17 | Bal. | 1.0 | 0.5 | 0.05 | 0.01 | 0.015 | 3.0 | <u>0.07500</u> | S | B | D |
| Comp. Ex. 18 | Bal. | 3.0 | 0.5 | 0.005 | 0.01 | 0.001 | 3.0 | <u>0.00017</u> | S | D | B |

Ex = Example
Comp. Ex. = Comparative Example
The underline indicates that it does not fall within the scope of the present invention.

TABLE 7

| | Alloy Composition (mass %) | | | | | | | optional element | Relation (1) | ΔT (K) | Ni leaching | void |
|---|---|---|---|---|---|---|---|---|---|---|---|---|
| | Sn | Ag | Cu | Ni | Co | Ge | Bi | | | | | |
| Ex. 134 | Bal. | 3.0 | 0.4 | 0.01 | 0.01 | 0.005 | 4.0 | | 0.00167 | S | B | B |
| Ex. 135 | Bal. | 2.0 | 0.4 | 0.03 | 0.01 | 0.005 | 4.0 | | 0.00750 | S | B | B |
| Ex. 136 | Bal. | 3.0 | 0.5 | 0.04 | 0.01 | 0.005 | 4.0 | | 0.00667 | S | B | B |
| Ex. 137 | Bal. | 3.0 | 0.4 | 0.05 | 0.01 | 0.005 | 4.0 | | 0.00833 | S | B | B |
| Ex. 138 | Bal. | 3.0 | 0.5 | 0.08 | 0.01 | 0.005 | 4.0 | | 0.01333 | S | B | B |
| Ex. 139 | Bal. | 3.0 | 0.5 | 0.01 | 0.04 | 0.005 | 4.0 | | 0.00042 | S | B | B |
| Ex. 140 | Bal. | 3.0 | 0.5 | 0.02 | 0.04 | 0.005 | 4.0 | | 0.00083 | S | B | B |
| Ex. 141 | Bal. | 3.0 | 0.4 | 0.03 | 0.02 | 0.005 | 4.0 | | 0.00250 | S | B | B |
| Ex. 142 | Bal. | 3.0 | 0.5 | 0.04 | 0.01 | 0.003 | 4.0 | | 0.00400 | S | B | B |
| Ex. 143 | Bal. | 3.0 | 0.5 | 0.05 | 0.01 | 0.003 | 4.0 | | 0.00500 | S | B | B |
| Ex. 144 | Bal. | 3.0 | 0.5 | 0.04 | 0.02 | 0.005 | 4.0 | | 0.00333 | S | B | B |
| Ex. 145 | Bal. | 3.0 | 0.4 | 0.05 | 0.02 | 0.005 | 4.0 | | 0.00417 | S | B | B |
| Ex. 146 | Bal. | 3.0 | 0.5 | 0.07 | 0.03 | 0.005 | 4.0 | | 0.00389 | S | B | B |
| Ex. 147 | Bal. | 3.0 | 0.4 | 0.03 | 0.08 | 0.005 | 4.0 | | 0.00063 | S | B | B |
| Ex. 148 | Bal. | 3.0 | 0.4 | 0.04 | 0.09 | 0.005 | 4.0 | | 0.00074 | S | B | B |
| Ex. 149 | Bal. | 3.0 | 0.5 | 0.05 | 0.05 | 0.005 | 4.0 | | 0.00167 | B | B | B |
| Ex. 150 | Bal. | 3.0 | 0.7 | 0.05 | 0.01 | 0.005 | 4.0 | | 0.00833 | S | B | B |
| Ex. 151 | Bal. | 3.0 | 0.7 | 0.09 | 0.01 | 0.005 | 4.0 | | 0.01500 | S | B | B |
| Ex. 152 | Bal. | 3.0 | 0.8 | 0.03 | 0.03 | 0.005 | 4.0 | | 0.00167 | S | B | B |
| Ex. 153 | Bal. | 3.0 | 0.7 | 0.05 | 0.04 | 0.005 | 4.0 | | 0.00208 | S | B | B |
| Ex. 154 | Bal. | 1.0 | 0.7 | 0.07 | 0.03 | 0.005 | 4.0 | | 0.01167 | B | B | B |
| Ex. 155 | Bal. | 3.0 | 0.1 | 0.07 | 0.03 | 0.005 | 4.0 | | 0.00389 | B | B | B |
| Ex. 156 | Bal. | 4.0 | 0.5 | 0.07 | 0.03 | 0.005 | 4.0 | | 0.00292 | B | B | B |
| Ex. 157 | Bal. | 3.0 | 0.5 | 0.05 | 0.005 | 0.005 | 4.0 | | 0.01667 | S | B | B |
| Ex. 158 | Bal. | 3.0 | 1.0 | 0.04 | 0.01 | 0.003 | 4.0 | | 0.00400 | S | B | B |
| Ex. 159 | Bal. | 3.0 | 0.4 | 0.01 | 0.01 | 0.005 | 2.0 | Mn: 0.01 | 0.00167 | S | B | B |
| Ex. 160 | Bal. | 3.0 | 0.4 | 0.01 | 0.01 | 0.005 | 2.0 | Pd: 0.01 | 0.00167 | S | B | B |
| Ex. 161 | Bal. | 3.0 | 0.4 | 0.01 | 0.01 | 0.005 | 2.0 | Au: 0.01 | 0.00167 | S | B | B |
| Ex. 162 | Bal. | 3.0 | 0.4 | 0.01 | 0.01 | 0.005 | 2.0 | Cr: 0.01 | 0.00167 | S | B | B |
| Ex. 163 | Bal. | 3.0 | 0.4 | 0.01 | 0.01 | 0.005 | 2.0 | Fe: 0.01 | 0.00167 | S | B | B |

TABLE 7-continued

| | Alloy Composition (mass %) | | | | | | | optional element | Relation (1) | ΔT (K) | Ni leaching | void |
|---|---|---|---|---|---|---|---|---|---|---|---|---|
| | Sn | Ag | Cu | Ni | Co | Ge | Bi | | | | | |
| Ex. 164 | Bal. | 3.0 | 0.4 | 0.01 | 0.01 | 0.005 | 2.0 | V: 0.01 | 0.00167 | S | B | B |
| Ex. 165 | Bal. | 3.0 | 0.4 | 0.01 | 0.01 | 0.005 | 2.0 | Mo: 0.01 | 0.00167 | S | B | B |
| Ex. 166 | Bal. | 3.0 | 0.4 | 0.01 | 0.01 | 0.005 | 2.0 | Nb: 0.01 | 0.00167 | S | B | B |
| Comp. Ex. 19 | Bal. | 1.0 | 0.5 | 0.05 | 0.01 | 0.015 | 4.0 | | <u>0.07500</u> | S | B | D |
| Comp. Ex. 20 | Bal. | 3.0 | 0.5 | 0.005 | 0.01 | 0.001 | 4.0 | | <u>0.00017</u> | S | D | B |

Ex = Example
Comp. Ex. = Comparative Example
The underline indicates that it does not fall within the scope of the present invention.

TABLE 8

| | Alloy Composition (mass %) | | | | | | | Relation (1) | ΔT (K) | Ni leaching | void |
|---|---|---|---|---|---|---|---|---|---|---|---|
| | Sn | Ag | Cu | Ni | Co | Ge | Bi | | | | |
| Ex. 167 | Bal. | 3.0 | 0.4 | 0.03 | 0.01 | 0.005 | 6.0 | 0.00500 | S | B | B |
| Ex. 168 | Bal. | 3.0 | 0.4 | 0.05 | 0.01 | 0.005 | 6.0 | 0.00833 | S | B | B |
| Ex. 169 | Bal. | 3.0 | 0.5 | 0.08 | 0.01 | 0.005 | 6.0 | 0.01333 | S | B | B |
| Ex. 170 | Bal. | 3.0 | 0.5 | 0.02 | 0.04 | 0.005 | 6.0 | 0.00083 | S | B | B |
| Ex. 171 | Bal. | 3.0 | 0.5 | 0.03 | 0.02 | 0.003 | 6.0 | 0.00150 | S | B | B |
| Ex. 172 | Bal. | 3.0 | 0.5 | 0.05 | 0.01 | 0.003 | 6.0 | 0.00500 | S | B | B |
| Ex. 173 | Bal. | 3.0 | 0.4 | 0.05 | 0.02 | 0.005 | 6.0 | 0.00417 | S | B | B |
| Ex. 174 | Bal. | 3.0 | 0.5 | 0.07 | 0.03 | 0.005 | 6.0 | 0.00389 | S | B | B |
| Ex. 175 | Bal. | 3.0 | 0.4 | 0.04 | 0.09 | 0.005 | 6.0 | 0.00074 | S | B | B |
| Ex. 176 | Bal. | 3.0 | 0.7 | 0.03 | 0.01 | 0.005 | 6.0 | 0.00500 | S | B | B |
| Ex. 177 | Bal. | 3.0 | 0.7 | 0.09 | 0.01 | 0.005 | 6.0 | 0.01500 | A | B | B |
| Ex. 178 | Bal. | 3.0 | 0.7 | 0.05 | 0.04 | 0.005 | 6.0 | 0.00208 | S | B | B |
| Ex. 179 | Bal. | 1.0 | 0.7 | 0.07 | 0.03 | 0.005 | 6.0 | 0.01167 | B | B | B |
| Ex. 180 | Bal. | 4.0 | 0.5 | 0.07 | 0.03 | 0.005 | 6.0 | 0.00292 | B | B | B |
| Ex. 181 | Bal. | 3.0 | 0.4 | 0.01 | 0.01 | 0.015 | 6.0 | 0.00500 | S | B | B |

Ex = Example
Comp. Ex. = Comparative Example
The underline indicates that it does not fall within the scope of the present invention.

TABLE 9

| | Alloy Composition (mass %) | | | | | | | Relation (1) | ΔT (K) | Ni leaching | void |
|---|---|---|---|---|---|---|---|---|---|---|---|
| | Sn | Ag | Cu | Ni | Co | Ge | Bi | | | | |
| Ex. 182 | Bal. | 3.0 | 0.4 | 0.01 | 0.01 | 0.005 | 9.0 | 0.00167 | S | B | B |
| Ex. 183 | Bal. | 3.0 | 0.4 | 0.03 | 0.01 | 0.005 | 9.0 | 0.00500 | S | B | B |
| Ex. 184 | Bal. | 3.0 | 0.5 | 0.04 | 0.01 | 0.005 | 9.0 | 0.00667 | S | B | B |
| Ex. 185 | Bal. | 3.0 | 0.4 | 0.05 | 0.01 | 0.005 | 9.0 | 0.00833 | S | B | B |
| Ex. 186 | Bal. | 3.0 | 0.5 | 0.08 | 0.01 | 0.005 | 9.0 | 0.01333 | S | B | B |
| Ex. 187 | Bal. | 3.0 | 0.5 | 0.01 | 0.04 | 0.005 | 9.0 | 0.00042 | S | B | B |
| Ex. 188 | Bal. | 3.0 | 0.4 | 0.03 | 0.02 | 0.005 | 9.0 | 0.00250 | S | B | B |
| Ex. 189 | Bal. | 3.0 | 0.5 | 0.03 | 0.02 | 0.003 | 9.0 | 0.00150 | S | B | B |
| Ex. 190 | Bal. | 3.0 | 0.5 | 0.05 | 0.01 | 0.003 | 9.0 | 0.00500 | S | B | B |
| Ex. 191 | Bal. | 3.0 | 0.5 | 0.04 | 0.02 | 0.005 | 9.0 | 0.00333 | S | B | B |
| Ex. 192 | Bal. | 3.0 | 0.4 | 0.05 | 0.02 | 0.005 | 9.0 | 0.00417 | S | B | B |
| Ex. 193 | Bal. | 3.0 | 0.5 | 0.07 | 0.03 | 0.005 | 9.0 | 0.00389 | S | B | B |
| Ex. 194 | Bal. | 3.0 | 0.4 | 0.04 | 0.09 | 0.005 | 9.0 | 0.00074 | A | B | B |
| Ex. 195 | Bal. | 3.0 | 0.7 | 0.03 | 0.01 | 0.005 | 9.0 | 0.00500 | S | B | B |
| Ex. 196 | Bal. | 3.0 | 0.7 | 0.2 | 0.01 | 0.0025 | 9.0 | 0.01667 | S | B | B |
| Ex. 197 | Bal. | 3.0 | 0.7 | 0.03 | 0.03 | 0.005 | 9.0 | 0.00167 | S | B | B |
| Ex. 198 | Bal. | 3.0 | 0.7 | 0.05 | 0.04 | 0.005 | 9.0 | 0.00208 | A | B | B |
| Ex. 199 | Bal. | 3.0 | 0.7 | 0.07 | 0.03 | 0.005 | 9.0 | 0.00389 | B | B | B |
| Ex. 200 | Bal. | 3.0 | 0.7 | 0.3 | 0.04 | 0.003 | 9.0 | 0.00750 | B | B | B |
| Ex. 201 | Bal. | 3.0 | 0.1 | 0.07 | 0.03 | 0.005 | 9.0 | 0.00389 | B | B | B |
| Ex. 202 | Bal. | 4.0 | 0.5 | 0.07 | 0.03 | 0.005 | 9.0 | 0.00292 | B | B | B |
| Ex. 203 | Bal. | 3.0 | 1.0 | 0.04 | 0.01 | 0.003 | 9.0 | 0.00400 | A | B | B |

TABLE 9-continued

| | Alloy Composition (mass %) | | | | | | Relation | ΔT | Ni | |
|---|---|---|---|---|---|---|---|---|---|---|
| | Sn | Ag | Cu | Ni | Co | Ge | Bi | (1) | (K) | leaching | void |
| Comp. Ex. 21 | Bal. | 1.0 | 0.5 | 0.05 | 0.01 | 0.015 | 9.0 | 0.07500 | S | B | D |
| Comp. Ex. 22 | Bal. | 3.0 | 0.5 | 0.005 | 0.01 | 0.001 | 9.0 | 0.00017 | S | D | B |
| Comp. Ex. 23 | Bal. | 3.0 | 0.5 | 0.05 | 0.2 | 0.003 | 9.0 | 0.00025 | D | — | — |
| Comp. Ex. 24 | Bal. | 0.1 | 0.5 | 0.01 | 0.02 | 0.003 | 9.0 | 0.01500 | S | B | B |
| Comp. Ex. 25 | Bal. | 5.0 | 0.5 | 0.03 | 0.02 | 0.003 | 9.0 | 0.00090 | S | B | B |
| Comp. Ex. 26 | Bal. | 3.0 | 0.5 | 0.001 | 0.02 | 0.015 | 9.0 | 0.00025 | S | D | B |
| Comp. Ex. 27 | Bal. | 3.0 | 0.5 | 0.1 | 0.1 | 0.003 | 9.0 | 0.01000 | D | — | — |

Ex = Example
Comp. Ex. = Comparative Example
The underline indicates that it does not fall within the scope of the present invention.

As shown in Tables 1 to 9, according to Examples 1 to 203, the content of each constituent element and the relation (1) were satisfied for all the alloy compositions, whereby Ni leaching and voids at bonded interfaces were not observed. In addition, it was also confirmed that they exhibited higher tensile strength than Comparative Examples 1 to 27.

On the other hand, according to Comparative Examples 1, 8, 15, 17, 19, and 21, the contents of Ag, Co, Ge, and Ni were not well-balanced due to exceeding the upper limit of the relation (1), so that voids were generated. According to Comparative Examples 2, 9, 16, 18, 20, 22, and 27, the balance of the contents of Ag, Co, Ge, and Ni was poor because the relation (1) is lower than the lower limit, so that they were inferior with regard to Ni leaching.

The evaluation regarding ΔT of Comparative Examples 3, 10, and 23 were "D" because the liquidus temperature was high due to high Co content. Because the liquidus temperature was 500° C. or higher and a solder joint could not be formed, no other evaluation was performed. For Comparative Examples 4, 11, and 24, it was confirmed that since a small amount of $Ag_3Sn$ was precipitated due to low Ag-content, the tensile strength was low as compared with those of Examples 1 to 203. For Comparative Examples 5, 12, and 25, it was confirmed that since coarse $Ag_3Sn$ was precipitated due to too high Ag content, the tensile strength was low as compared with those of Examples 1 to 203.

For Comparative Examples 6, 13, and 26, Ni leaching could not be suppressed because the Ni content was small. Comparative Examples 7, 14, and 27 were not evaluated because the liquidus temperature was high due to too high Ni content and a solder joint could not be formed.

As mentioned above, the solder alloy of the examples have small ΔT, high tensile strength, can suppress Ni leaching, and can suppress generation of voids at the bonded interface, so that they enable high-quality die bonding.

The invention claimed is:

1. A lead-free and antimony-free solder alloy having an alloy composition consisting of, by mass %, Ag: 1.0 to 4.0%, Cu: 0.1 to 1.0%, Ni: 0.005 to 0.3%, Co: 0.005 to 0.1%, Ge: 0.001 to 0.015%, Bi: 0.1 to 9.0%, and optionally Fe with an upper limit of 0.01% by mass %, and optionally one or more elements selected from the group consisting of Mn, Pd, Au, Pt, Cr, V, Mo, and Nb each with an upper limit of 0.01% by mass %, with the balance being Sn, wherein the alloy composition satisfies the following relation (1):

$$0.003 < (Ni/Co) \times (1/Ag) \times Ge < 0.05 \quad (1)$$

wherein Ni, Co, Ag, and Ge in the relation (1) each represent the contents (mass %) in the alloy composition, wherein an average value of an area ratio of void generated at a solder joint interface is 10% or less.

2. The lead-free and antimony-free solder alloy according to claim 1, wherein the Bi content is 1.0 to 5.0%.

3. The lead-free and antimony-free solder alloy according to claim 1, wherein the Bi content is 2.0 to 4.0%.

4. The lead-free and antimony-free solder alloy according to claim 1, wherein the Ag content is 1.5 to 3.5%.

5. The lead-free and antimony-free solder alloy according to claim 1, wherein the Ag content is 2.0 to 3.0%.

6. The lead-free and antimony-free solder alloy according to wherein the alloy composition satisfies the following relation (2):

$$0.00150 \leq (Ni/Co) \times (1/Ag) \times Ge \leq 0.00833 \quad (2)$$

wherein Ni, Co, Ag, and Ge in the relation (2) each represent the contents (mass %) in the alloy composition.

7. A solder ball comprising the lead-free and antimony-free solder alloy according to claim 1.

8. A ball grid array formed using the solder ball according to claim 7.

9. A solder joint comprising the lead-free and antimony-free solder alloy according to claim 1.

* * * * *

UNITED STATES PATENT AND TRADEMARK OFFICE
CERTIFICATE OF CORRECTION

PATENT NO. : 12,383,987 B2
APPLICATION NO. : 17/633608
DATED : August 12, 2025
INVENTOR(S) : Yuuki Iijima et al.

Page 1 of 1

It is certified that error appears in the above-identified patent and that said Letters Patent is hereby corrected as shown below:

On the Title Page

Column 2, item (57) Abstract, Line 2, delete "Co," and insert -- Ni, Co, --

In the Claims

Column 21, Line 55, Claim 1, delete "0.1%," and insert -- 0.02%, --

Column 22, Line 25, Claim 1, delete "0.003<(Ni/Co)×(1/Ag)×Ge<0.05" and insert -- 0.00030<(Ni/Co)×(1/Ag)×Ge<0.05 --

Column 22, Line 41, Claim 6, delete "to" and insert -- to claim 1, --

Signed and Sealed this
Twenty-first Day of October, 2025

John A. Squires
*Director of the United States Patent and Trademark Office*